United States Patent
Rieser

(10) Patent No.: US 9,650,004 B2
(45) Date of Patent: May 16, 2017

(54) OUTER PANEL COMPONENT OF A MOTOR VEHICLE

(71) Applicant: SMP DEUSCHLAND GMBH, Bötzingen (DE)

(72) Inventor: Wolfgang Rieser, Gutach (DE)

(73) Assignee: SMP DEUTSCHLAND GMBH, Bötzingen (DE)

( * ) Notice: Subject to any disclaimer, the term of this patent is extended or adjusted under 35 U.S.C. 154(b) by 0 days.

(21) Appl. No.: 14/772,830

(22) PCT Filed: Jun. 28, 2013

(86) PCT No.: PCT/EP2013/063727
§ 371 (c)(1),
(2) Date: Oct. 5, 2015

(87) PCT Pub. No.: WO2014/135228
PCT Pub. Date: Sep. 12, 2014

(65) Prior Publication Data
US 2016/0052472 A1 Feb. 25, 2016

(30) Foreign Application Priority Data
Mar. 6, 2013 (DE) .................... 20 2013 100 971 U

(51) Int. Cl.
*B62D 27/02* (2006.01)
*B60R 19/24* (2006.01)
*B60R 19/18* (2006.01)

(52) U.S. Cl.
CPC .............. *B60R 19/18* (2013.01); *B60R 19/24* (2013.01); *B62D 27/02* (2013.01); *B60R 2019/1886* (2013.01)

(58) Field of Classification Search
CPC .................. B60R 19/18; B60R 2019/1886
(Continued)

(56) References Cited

U.S. PATENT DOCUMENTS

| | | | | |
|---|---|---|---|---|
| 4,299,418 A | * | 11/1981 | Dossin | B60R 19/26 293/126 |
| 5,242,200 A | * | 9/1993 | Kamm | B60R 19/24 293/126 |
| 6,641,191 B1 | * | 11/2003 | Berger | B62D 29/048 296/198 |

FOREIGN PATENT DOCUMENTS

DE 19736755 2/1999
EP 0417654 3/1991

OTHER PUBLICATIONS

International Search Report issued by the European Patent Office in International Application PCT/EP2013/063727.

* cited by examiner

*Primary Examiner* — Dennis H Pedder
(74) *Attorney, Agent, or Firm* — Ursula B. Day; Law Firm of Ursula B. Day

(57) ABSTRACT

The invention relates to an outer panel component of a motor vehicle, particularly a bumper for connection to sheet metal of the outer panel of a motor vehicle, the body shell of which has a mounting surface for connecting the outer panel component. The mounting surface runs from the outer side (A) of the motor vehicle to the inner side (I) and a leg, likewise running to the inner side (I), of the outer panel component run approximately in a parallel direction to the mounting surface. From the outside (A) at least to the inner end of the first region, the adjacent surface is free of burrs, caused by tool parting (W) for example, and following the first region, the adjacent surface assuming an increasing distance from the mounting surface in a second region, and runs downwards with clearance to a separation region.

10 Claims, 3 Drawing Sheets

(58) Field of Classification Search
USPC .................................................. 293/154, 155
See application file for complete search history.

OUTER PANEL COMPONENT OF A MOTOR VEHICLE

CROSS-REFERENCES TO RELATED APPLICATIONS

This application is the U.S. National Stage of International Application No. PCT/EP2013/063727, filed Jun. 28, 2013, which designated the United States and has been published as International Publication No. WO 2014/135228 and which claims the priority of German Patent Application, Serial No. 20 2013 100 971.7, filed Mar. 6, 2013, pursuant to 35 U.S.C. 119(a)-(d) the description of which is hereby incorporated by reference.

BACKGROUND OF THE INVENTION.

The invention refers to an outer panel component of a motor vehicle particularly bumpers, for connecting to a metal sheet of the exterior panel of a motor vehicle, as for example known from EP 0 417 654 B1.

In particular when connecting such outer panel components from plastic to a metal sheet there is always corrosion detected in a contact region of the different materials. This problem is adopted by EP 0 417 654 B1. The connection is made between a mounting surface of the vehicle body angled towards inside and a leg protruding from a bumper towards inside and having a strip-shaped extension. The strip-shaped extension is registered in an additional guide track that has to be attached prior to the vehicle body.

DE 10 2009 010 193 proposes an L-leg which is disposed as a separate element and intermediate piece.

It is accordingly known, that the mounting surface and an adjacent surface facing the leg extend from outside to inside in a first sector and substantially parallel to each other when viewing a cross section through the motor vehicle.

An object of the present invention is to provide an outer panel component, which is easy to connect to a vehicle body without causing any corrosion problems.

SUMMARY OF THE INVENTION

The problem is solved according to the present invention including an outer panel component of a motor vehicle, particularly bumpers for connecting to a metal sheet of the exterior panel of a motor vehicle, the body of which has a mounting surface for connecting the exterior panel component, wherein the mounting surface extends from the outer side (A) of the motor vehicle towards an interior (I) and a leg of the outer panel component also positioned towards the interior extends in approximately parallel direction to the mounting surface, wherein the mounting surface and an adjacent surface of leg facing the mounting surface extend substantially parallel to each other in a first sector that extends from outside (A) to inside (I) as viewed from a section through the motor vehicle, wherein from outside (A) to at least the inner end of the first sector the adjacent surface is free of any burrs that result from separation from the tool and that following the first sector, the adjacent surface assuming an increasing distance from the mounting surface in a second region, extends downwards with clearance to a tool parting line.

Advantageous embodiments are subject of the dependent claims.

According to the present invention, the adjacent surface, from an outer to an at least inner end of the first sector, is constructed free of flash, burrs or other sharp edged bumps that are for example due to mold tool parting. Following the first sector, the adjacent surface slopes with a clearance into a second sector away from the mounting surface to a parting sector, in particular, up to the tool parting line.

In the tool parting sector and preferably at its outer end in direction of the clearance, runs the tool parting according to a preferred embodiment. At this point, an inner distance between the mounting surface and the adjacent surface is securely established.

By placing the tool parting toward inside, no abrasion points are generated at the contact point between outer panel component and sheet metal.

With the known bumpers connected at a distance to a surface of the vehicle body without intermediate tracks or protective foil, the flash resulting from the tool partings that were oftentimes located outside in the contact area of the two critical surfaces, according to the present invention, are now placed toward inside and arranged at a greater distance to the sheet metal. Due to the dimension of the outer panel component, according to the present invention, burrs or flash will rather not damage the lacquer. The bothersome tool parting, or the resulting flash no longer has any contact with the negative side wall frame. The present invention includes a foil with the afore-stated features of the present invention, or a covering for an outer panel component.

According to an advantageous embodiment of an outer panel component according to the present invention, in the first sector, no outer distance is provided between the mounting surface and the adjacent surface. Thus, with the present invention, the formation of a zero joint is realized.

According to a further advantageous embodiment of the outer panel component according to the present invention, the clearance has a slope, preferably, and if applicable, sector-wise of approximately 7° relative to a coordinate system or grid of the motor vehicle.

According to a further advantageous embodiment of the outer panel component according to the present invention, following the tool parting sector and towards the inner side, a bulge is arranged which preferably bears against the mounting surface. A defined zero joint between bumper and side wall frame is thus stabilized along a suitable portion across the first sector.

According to a further advantageous embodiment of the outer panel component according to the present invention, the bulge with rounded flanks transitions into a bulge sector parallel to the mounting surface.

According to further advantageous embodiment according to the present invention, the outer panel component is connected to the vehicle body in an inner end area, and in particular by means of an attachment element passing through a through hole.

According to further advantageous embodiment of the outer panel component according to the present invention, an exterior wall extending to the leg and facing the leg is constructed at least partially thinned-out.

Following herein, the present invention is further explained by means of schematic illustrations. It is shown in:

BRIEF DESCRIPTION OF THE DRAWING

FIG. 1 illustrates an outer panel component 10 of a motor vehicle according to the present invention with a coordinate system K, which, as a so-called grid applies often to the entire motor vehicle A tool parting line W drawn in FIG. 1 clarifies that the problems with burrs that is underlying the present invention is solved further inside toward 1, as compared to the known outer panel components.

DETAILED DESCRIPTION OF PREFERRED EMBODIMENTS

Figure 1:
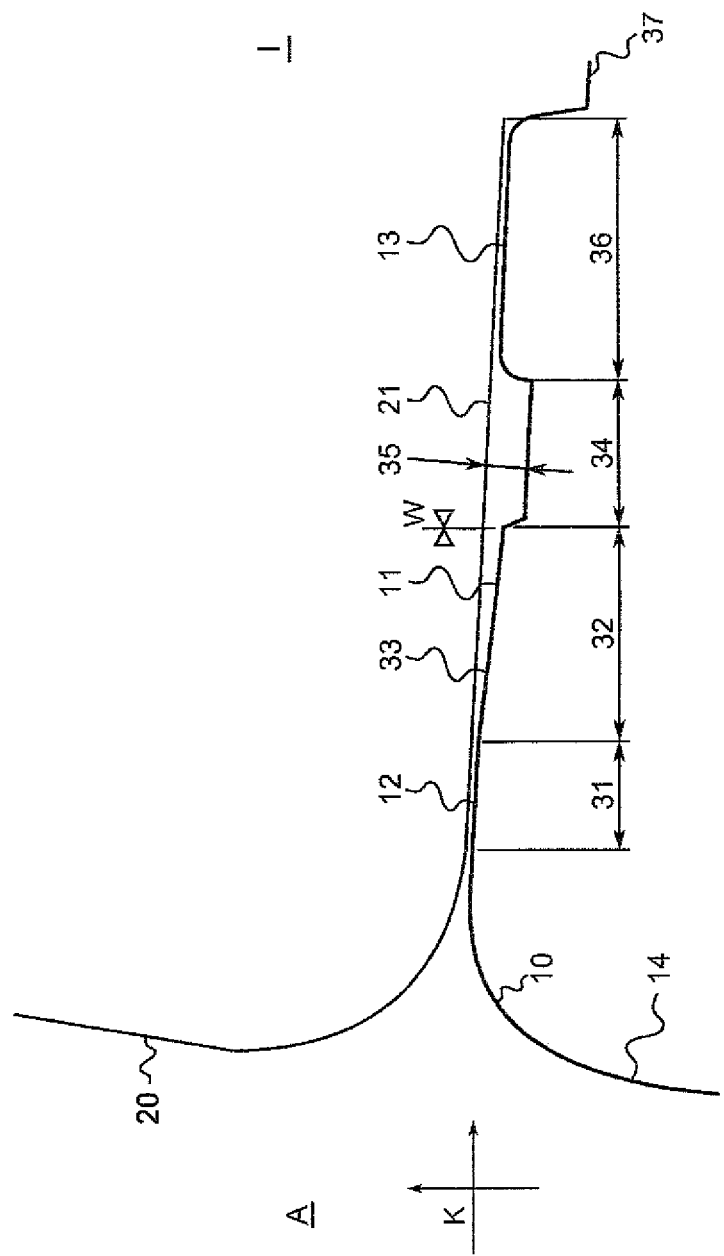
FIG. 1 a detail of a line drawing of an outer panel component according to the present invention, with bulge.

From an outer A extending exterior wall 14 of the outer panel component 10, in particular a bumper, when viewed towards inside I, according to FIG. 1, a mounting surface 21 of body 20 and an adjacent surface 12 of a leg 11 that runs toward inside the outer panel component 10, both first extend into a first sector 31 and at a constant width and in contact with each other, thus extend parallel to each other. Should an infinitesimal distance between the surfaces 12, 21 be detected in the illustration of FIG. 1, then this should only illustrate the limits of the surfaces that meet each other. Indeed the present invention serves to create a zero-joint line between the mounting surface 21 and the adjacent surface 12. According to the present invention, the adjacent surface 12 bearing against the mounting surface 21 across a constant width is realized in area 31, both can also slope 3° at least along a part of the first sector relative to the axis in a coordinate system K of the car.

Bordering the first sector 31, a joint widening follows via a second sector 32 provided by formation of a clearance 33 opposite the mounting surface 21 and sloping in a tool parting sector 34, in which, or at the beginning of which, the tool parting line W is provided according to the present invention. According to the present invention, the tool parting line W is thus located in an end sector of the clearance 33 or downstream. At that point, the adjacent surface 12 keeps an inner distance 35 from the mounting surface 21.

In the adjacent surface 12, following the clearance 33, a depression is configured as a tool parting sector 34. In the tool parting sector 34, the inner distance 35 is fixed so as to prevent any damage caused by a burr.

According to an especially preferred embodiment, inside and adjacent the parting sector 34, a bulge sector 36 is provided. At that point the adjacent surface 12 with a bulge 13 meets the mounting surface 21.

Figure 2:
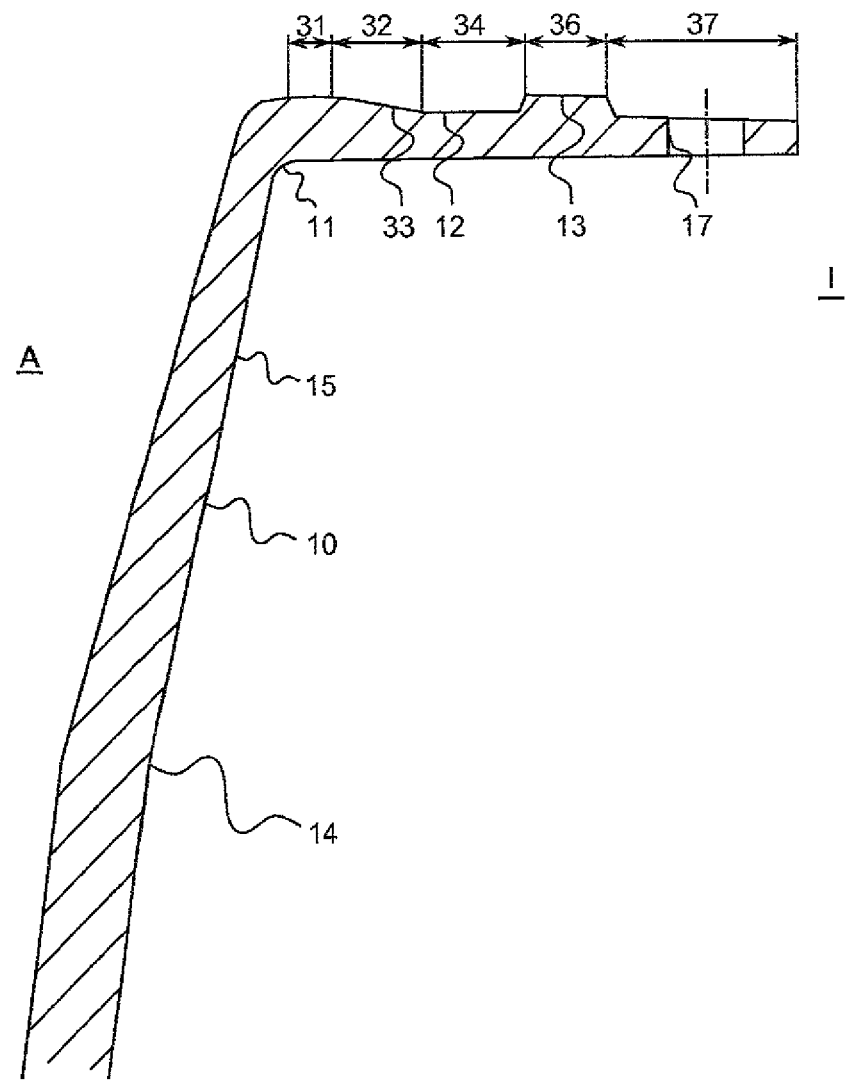
FIG. 2 a cut A-A through the outer panel component of FIG. 1 to illustrate the extension of the wall thickness.

FIG. 2 illustrates at section A-A (a shown in FIG. 3) the wall thicknesses of an outer panel component 10 of the present invention. An outer wall proceeds above in the L-shaped connection to the essentially horizontal leg 11 and ends further down in a small kink or pivot point to a desired wall thickness. The outer wall 14, according to the illustration in FIG. 2, is advantageously constructed becoming continuously more slender toward the leg 11. Viewed from below, it can be seen as a thinning 15 following from the pivot point. This facilitates the shaping of the component of the present invention during the manufacturing processes.

At the inner side I, leg 11 ends in an inner sector 37 provided with through holes 17 distanced from each other. The through holes 17 are provided for fastening elements (not shown here) that serve for attachment to the vehicle body.

Figure 3:
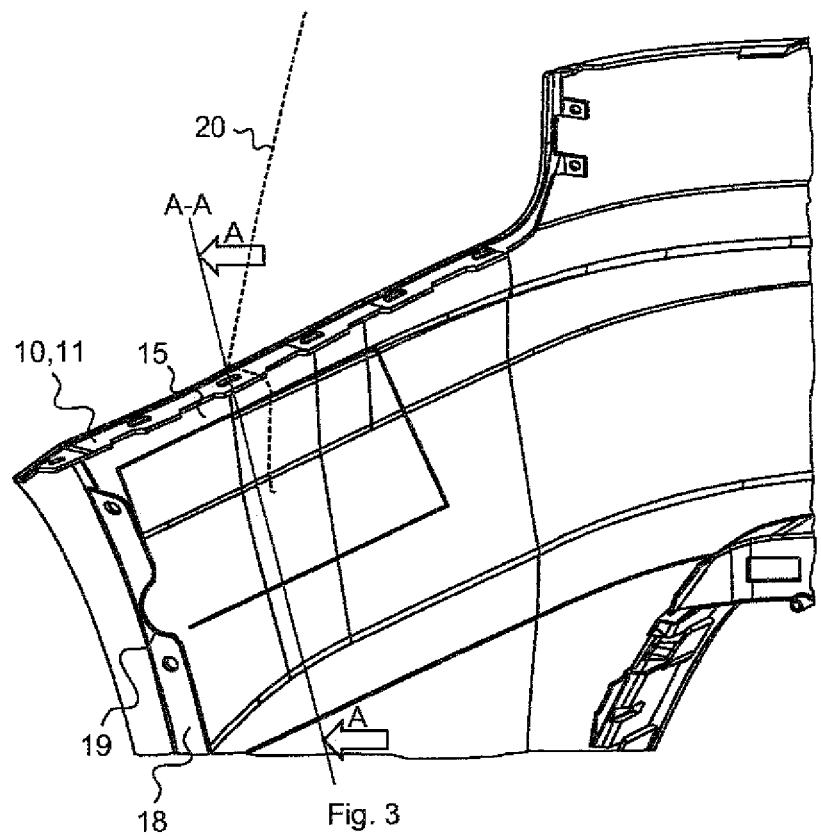
FIG. 3 a perspective view from inside onto an upper sector of the outer panel component of FIG. 1 showing cut A-A.
Figure 4:
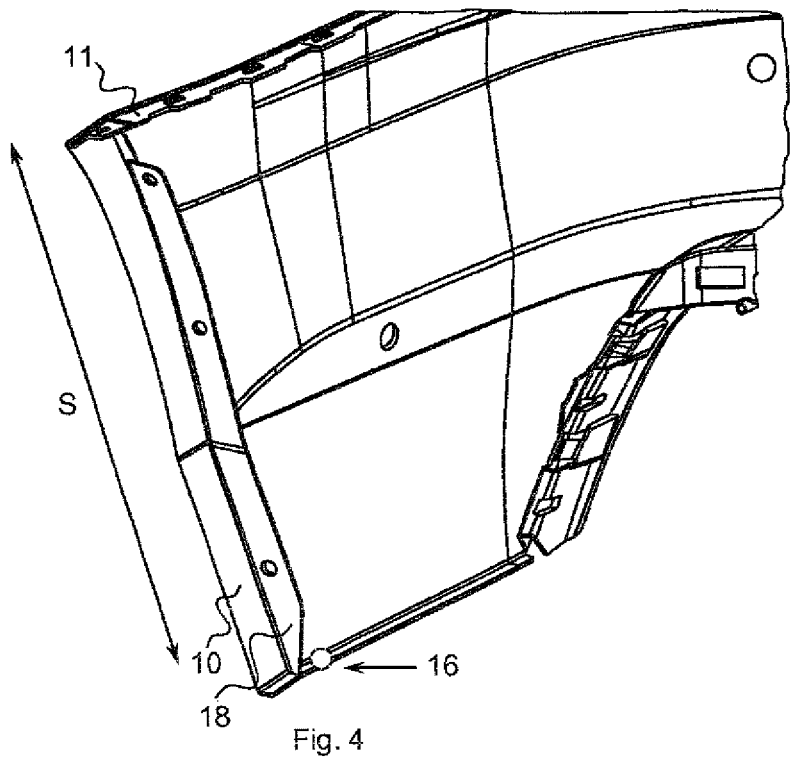
FIG. 4 a perspective view according to FIG. 3 onto a lower sector.

In FIGS. 3 and 4, details of a perspective inside view of the outer panel component 10 are shown. In FIG. 3, the upper end is shown in an enlarged view and for comparison, the course of a surface of the vehicle body 20 shown. The thinning 15 at a lower end thereof is shown in a pivot point. In the pivot point of the wall thinning, according to an advantageous embodiment, the wheel house flange 19 of a motor vehicle has a recess. To this end, a T-leg 18 projecting towards inside I from the outer wall 14 is partially removed. After assembly, the recess 19 is covered by a wheel house protector (not shown here).

In FIG. 4, further down at inner side I of outer wall 14, a holding point 16 is shown. By means of the holding point 16, the outer panel component 10, especially a bumper, is held at the underside during the demolding process, in order to influence material shrinkage in contraction direction S. The contraction in the advantageous embodiment (FIG. 4) as shown results one-sided downwardly.

What is claimed is:

1. An outer panel component of a motor vehicle for connecting to an outer paneling of a motor vehicle body, comprising:
a leg, with a portion of the leg oriented towards an inside of the vehicle body and divided into several sectors, wherein the portion of the leg forms a connection to the outer paneling of the vehicle, wherein a mounting surface of a metal sheet of the outer vehicle paneling and an adjacent surface of the leg portion and the mounting surface both extend in substantially parallel direction across a first sector of the leg portion from a relative outside position to a relative inside position of the vehicle, wherein the first sector up to the relative inside position is free of any burrs resulting from tool parting and the adjacent surface in a following second sector of the leg portion extends at an increasing distance to the mounting surface ending in a clearance that extends into a tool parting sector, wherein the tool parting sector is configured as a clearance pocket and following the pocket towards the inside includes a bulge shaped with rounded flanks for bearing against the mounting surface.

2. The outer panel component of claim 1, wherein the bulge with rounded flanks extends parallel to the corresponding portion of the mounting surface for approximately 2 mm.

3. The outer panel component of claim 1, wherein a tool parting line lies in a the tool parting sector at an end of the clearance with a distance between the mounting surface and the adjacent surface.

4. The outer panel component of claim 1, wherein the first sector extends approximately 2 mm.

5. The outer panel component of claim 1, wherein the adjacent surface relative to the mounting surface in the first sector forms a zero-joint with the adjacent surface at least along a part of the sector.

6. The outer panel component of claim 1, wherein the adjacent surface and the mounting surface in the first sector slopes at 3° at least along a part of the sector relative to an axis in a coordinate system (K) of the car.

7. The outer panel component of claim 1, wherein the clearance exhibits a slope of 7° relative to the mounting surface at least along a part of a second sector.

8. The outer panel component of claim 1, further comprising through holes for connecting to the vehicle body in an innermost sector for use with suitable connecting elements.

9. The outer panel component of claim 1, wherein an outer wall of the leg at least in part is configured partially thinned out.

10. The outer panel component of claim 9, wherein the outer wall of the leg and facing away from the leg is provided with a holding point.

\* \* \* \* \*